Patented July 1, 1924.

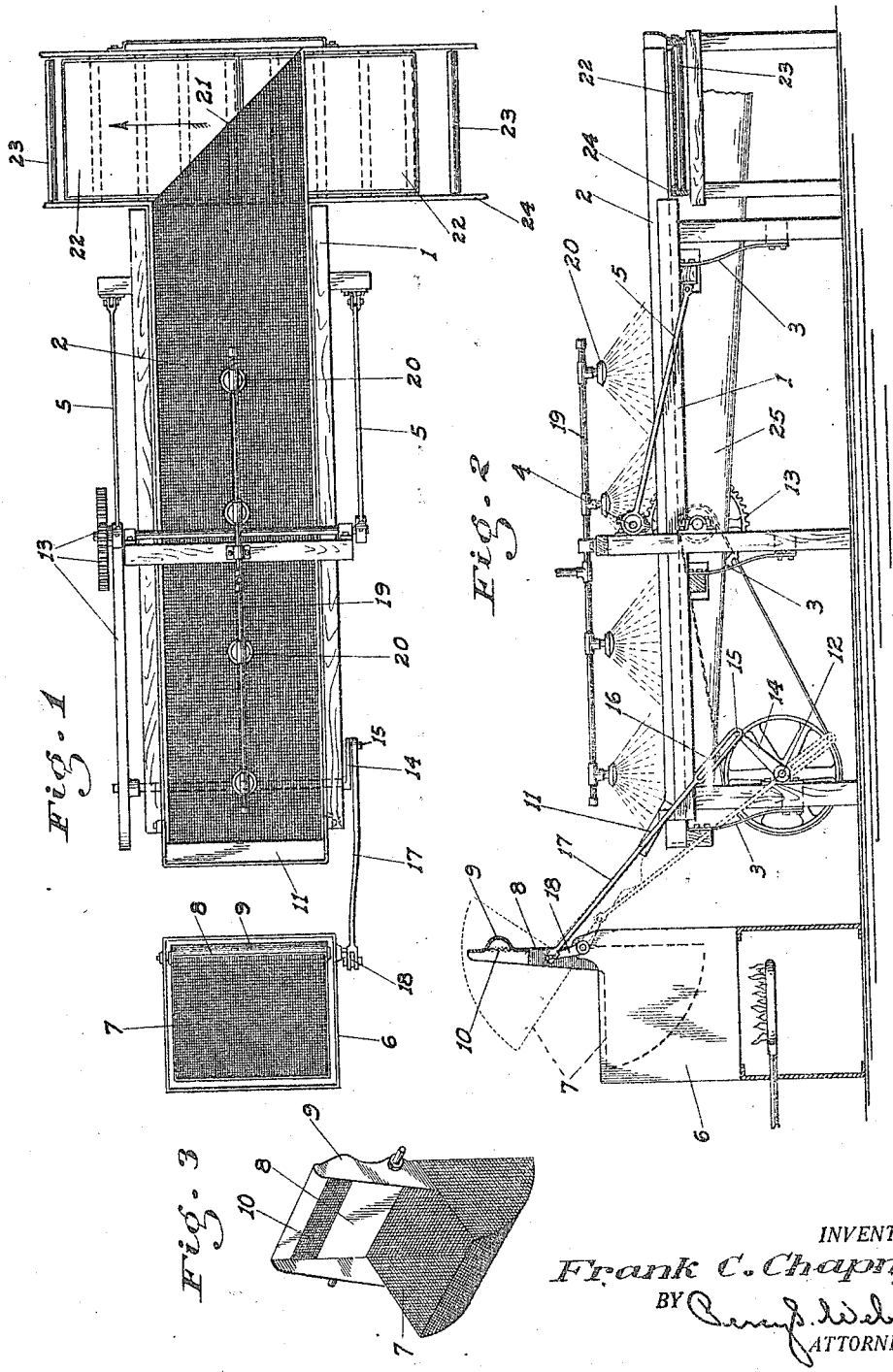

1,499,443

UNITED STATES PATENT OFFICE.

FRANK CARPENTER CHAPMAN, OF MODESTO, CALIFORNIA.

FRUIT DIPPING AND CLEANING APPARATUS.

Application filed October 1, 1923. Serial No. 665,888.

*To all whom it may concern:*

Be it known that I, FRANK C. CHAPMAN, a citizen of the United States, residing at Modesto, county of Stanislaus, State of California, have invented certain new and useful Improvements in Fruit Dipping and Cleaning Apparatus; and I do declare the following to be a full, clear, and exact description of the same, reference being had to the accompanying drawings, and to the characters of reference marked thereon, which form a part of this application.

This invention relates to improvements in fruit handling apparatus, and particularly to a machine for handling prunes, which, to properly prepare them, must be dipped in lye, then washed, and finally spread out on trays to dry.

The principal objects of my invention are to provide an apparatus for the above named purpose having a lye-vat, a cleaning and shaking table, a dipping basket and a tray-conveyor, so constructed that the fruit placed in the basket will be automatically dumped onto the table; when on the latter the fruit will be thoroughly and automatically washed; and from the table the fruit will be automatically spread very evenly on trays supported on the conveyor and passing by the end of the table.

This construction enables quicker and better work being done than is ordinarily possible, and gives a great saving of labor, since one man—to dump the fruit into the dipping basket—is the only person necessary in the operation of the apparatus.

Another important feature is the provision, for catching the lye as the basket is dumped and preventing it from spilling onto the table with the fruit. This caught lye, being immediately returned to the vat, in the long run effects a considerable saving of this product.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 1 is a top plan view of the apparatus.
Fig. 2 is a side view of the same, and
Fig. 3 is a perspective view of the dipping basket with the lye saving attachment.

Referring now more particularly to the characters of reference on the drawings, the numeral 1 denotes a framework having a screened shaker table 2 of ordinary form mounted in connection therewith and supported by strap springs 3. A driven shaft 4 imparts vibratory movement to the table by means of eccentrically driven rods 5. This of course is a common arrangement, and in itself forms no part of my invention.

Beyond one end of the table and in alinement therewith is a lye-vat 6, pivotally mounted along one edge in connection with which is a dipping basket 7, adapted to be sumberged in the contents of the vat. Formed as an extension of the side of the basket adjacent its axis and therebeyond is an apron 8, non-perforated, and having intermediate its ends a transverse trough 9, closed on the ends and covered with screening 10.

The basket is adapted to be swung upwardly and forwardly out of the vat until the apron and adjacent side of the basket lie at a considerable downward angle; the outer end of the apron then resting on and overlapping a short chute 11 discharging onto the shaking table.

The basket is dumped, returned to its position in the vat, held there for a definite period and again dumped, in continuous rotation as long as the table is shaking by means of a shaft 12 driven from the shaft 4 at a greatly reduced speed by gearing 13 and the like, said shaft 12 having a crank 14 thereon whose pin 15 engages the slotted end 16 of a connecting rod 17 leading thence to a crank 18 fixed on the adjacent basket-pivot.

This operating mechanism is so designed that with a continuous rotation of the shaft 12, a quarter-turn of the latter will cause the basket to be moved from a vertical to a dumping position; another quarter turn of said shaft will cause the return of the basket to its vertical position in the vat, where it will rest through the other half turn of the shaft. This gives plenty of time for the operator, who stands near the vat, to dump the fruit into the basket, and knowing the exact number of seconds the basket will automatically remain at rest, he may judge the time of dumping of the fruit into the basket to suit different conditions.

Extending above the table is a water pipe 19 having a plurality of downwardly facing spray nozzles 20, the sprays being constantly in operation with the operation of the apparatus as a whole and covering the entire width and most of the length of the table.

The discharging end of the table, which is that end opposite to the vat, is cut on a diagonal as shown at 21, this diagonal edge being of sufficient length to extend the full width of and over a drying tray 22, a continuously moving line of which are passed under said end of the table transversely thereof. A suitable form of conveyor, such as rollers 23 mounted in a frame 24, supports the trays.

This diagonal cutting of the end of the shaker table, which of course is open or non-obstructed insures that the fruit, as it rolls from the table, will be evenly spread onto the trays for the full width thereof instead of in the form of a ridge requiring hand leveling.

A sloping water trough 25 under the table carries away the water passing therethrough.

By reason of the apron-trough 9, when the prunes roll down the apron when the latter is tilted to dump onto the table, most of whatever lye flows down the incline with the prunes is caught by the trough instead of continuing onto the table to be washed away and wasted. At the same time the screen which covers the trough prevents any fruit from being caught therein. When the basket is again lowered any lye in the trough at once returns to the vat, so that practically none is wasted.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a fruit cleaning apparatus, a shaker table on which the fruit to be cleaned is dumped, and a tray conveyor extending transversely of the table at one end thereof, said end being cut diagonally, the diagonal edge extending over a tray for the full width thereof.

2. In a fruit cleaning apparatus, a shaker table on which the fruit to be cleaned is dumped, a tray conveyor extending transversely of the table at one end thereof, and means whereby fruit discharged from said end of the table onto a tray will be automatically spread over the full width of the latter.

3. In a fruit dipping and cleaning apparatus having a table on which the fruit is dumped after dipping, a lye vat at one end of the table, and a dipping basket pivotally mounted on the vat and arranged to be submerged in the latter and to be raised out of the vat to assume a downwardly tilted position and to then discharge onto the table, power means for causing the basket to be raised and lowered in continuous sequence, and means whereby the basket will positively remain stationary in the vat for a predetermined time after each lowering operation has taken place.

4. In a fruit dipping and cleaning apparatus having a shaking table on which the fruit is dumped after dipping, a lye vat at one end of the table, and a dipping basket pivotally mounted on the vat and arranged to be submerged in the latter and to be raised out of the vat to assume a downwardly tilted position and to then discharge onto the table, and power means for causing the basket to be raised, power means for shaking the table and means operated in connection with said power means for so actuating the basket in continuous sequence.

5. In a fruit dipping and cleaning apparatus having a table on which the fruit is dumped after dipping, a lye vat at one end of the table, and a dipping basket arranged to be submerged in the vat and then raised to dump on to the table; a solid apron down which the fruit rolls when discharging from the basket onto the table, and a screen covered trough formed in the apron and extending transversely thereof.

6. In a fruit dipping and cleaning apparatus having a table on which the fruit is dumped after dipping, a lye vat at one end of the table, and a dipping basket arranged to be submerged in the vat and then raised to dump on to the table; a solid apron formed with the basket and projecting beyond that side which is tilted to dump the fruit, and a transverse fluid catching trough formed in the apron.

7. A dipping basket for fruit cleaning apparatus comprising a foraminous body portion, a discharging apron projecting beyond one side thereof, pivotal means for supporting the basket, a liquid-catching trough provided with said apron, and extending transversely thereof, and screen means covering said trough said apron normally setting in a vertical plane and the trough being disposed to cause any liquid therein to drain back into the basket.

8. In a fruit dipping apparatus, a vat, a dipping basket having a pivot mounted on the vat and arranged to be submerged in and raised out of the latter, a shaft adapted for continuous rotation, a crank arm on the basket pivot, a crank arm on the shaft, connecting means between said arms, and means whereby for a certain portion of a revolution of the shaft no rotation will be imparted to the basket pivot.

9. In a fruit dipping apparatus, a vat, a dipping basket having a pivot mounted on the vat and arranged to be submerged in and raised out of the latter, a shaft adapted for continuous rotation, a crank arm on the basket pivot, a crank arm on the shaft, a pin on one of said arms, and a connecting rod attached to the other arm and provided at its opposite end with a slot through which the pin passes.

In testimony whereof I affix my signature.

FRANK CARPENTER CHAPMAN.